United States Patent [19]

Nagai et al.

[11] Patent Number: 5,765,122
[45] Date of Patent: Jun. 9, 1998

[54] NAVIGATION SYSTEM

[75] Inventors: Takaaki Nagai; Hiroshi Uematsu, both of Wako, Japan

[73] Assignee: Honda Giken Kabushiki Kaisha, Tokyo, Japan

[21] Appl. No.: 556,610

[22] Filed: Nov. 13, 1995

[30] Foreign Application Priority Data

Nov. 14, 1994 [JP] Japan ................... 6-304346

[51] Int. Cl.$^6$ .................................. G06F 165/00
[52] U.S. Cl. .............. 701/208; 701/200; 701/201; 340/944
[58] Field of Search .............. 364/443, 444.1, 364/444.2, 449.1, 449.5, 449.2; 340/988, 990, 995, 994; 701/200, 201, 202, 207, 208, 211

[56] References Cited

U.S. PATENT DOCUMENTS

| | | | |
|---|---|---|---|
| 4,799,162 | 1/1989 | Shinkawa et al. | 340/994 |
| 5,220,507 | 6/1993 | Kirson | 364/449.5 |
| 5,243,529 | 9/1993 | Kashiwazaki | 364/449.2 |
| 5,448,485 | 9/1995 | Ishibashi et al. | 364/443 |
| 5,559,707 | 9/1996 | DeLorme et al. | 364/443 |

FOREIGN PATENT DOCUMENTS

532158A1   3/1993   European Pat. Off. .

*Primary Examiner*—Gary Chin
*Attorney, Agent, or Firm*—Lyon & Lyon LLP

[57] ABSTRACT

A navigation system includes a CD-ROM for storing operational schedule data of transportation means operating along railroad, road and air routes contained in a map to be displayed on a screen of the system, and a display for reading the operational schedule data from the CD-ROM and displaying the read operational schedule data on the screen. By the addition of a few elements to a conventional navigation system, a navigation system with new functions and improved cost performance is obtained.

6 Claims, 8 Drawing Sheets

NAVIGATION SYSTEM

BACKGROUND OF THE INVENTION

1. Field of the Invention

The present invention relates generally to a navigation system for use on a vehicle such as an automobile and, more particularly, to a vehicle navigation system capable of displaying operational schedule data relating to means of transportation which run along railroads or roads in a map being displayed on a display of the system.

2. Description of the Related Art

Normally, a vehicle-mounted navigation system is arranged such that it may store map data by means of a memory medium such as a CD-ROM and display the current location of a vehicle, detected by means of a GPS receiver and the like, in a predetermined range of a map incorporating the detected location, which is read from the CD-ROM and displayed on a display of the system.

As a consequence, the known system comprises a location detector, a CD-ROM, a processor, a display and other electronic devices and is thus relatively expensive, thus leaving a desire for its improved cost performance when taken in conjunction with added functions of the system.

It is therefore an object of the present invention to provide an improved navigation system which achieves added functions with the addition of the least amount of hardware which is expensive.

SUMMARY OF THE INVENTION

The navigation system according to the present invention is arranged to perform, in addition to the conventional function of determining the current location of a moving object and displaying the determined location of the moving object in read map data incorporating the detected location, two new functions, namely, one of storing operational schedule data of transportation means which run along railroad, road or air routes and are included in the map data, and the other of reading the operational schedule data of the means of transportation included in map data being displayed and displaying the read data on a display of the system, whereby the system is rendered capable of displaying information relative to the means of transportation, leading to improved cost performance thereof.

Due to unexpected traffic jams, vehicle drivers and fellow passengers often miss the trains or other transportation means scheduled to get on board, in which instance the drivers and fellow passengers can easily find out the departure time, as well as the time of arrival at the intended destination, of the following train from the operational schedule data displayed on the display of the navigation system. With some known navigation systems, difficulty is often experienced in correctly detecting the current vehicle location in that the names of displayed railway lines can not be determined. By contrast, with the system according to the present invention, it is possible to easily find out the names of the displayed railway lines by displaying the operational schedule data of the lines. With the inventive system, it is also possible to have an approaching train displayed, whereby safety at invisible railroad crossings may be enhanced.

With the inventive system, it is further possible to display, for purposes of amusement, data representative of the destination of an airplane flying over a vehicle carrying the system. These useful new functions may be achieved by the inventive navigation system which is formed by addition to a known system of a CD-ROM and the like for storing data relative to the means of transportation and by addition of partial control program for allowing display of the transportation means data, to a control program in a processor of the known system. Consequently, the inventive navigation system achieves added functions with the addition of the least amount of hardware, thus enhancing its cost performance.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENT

Figure 1:
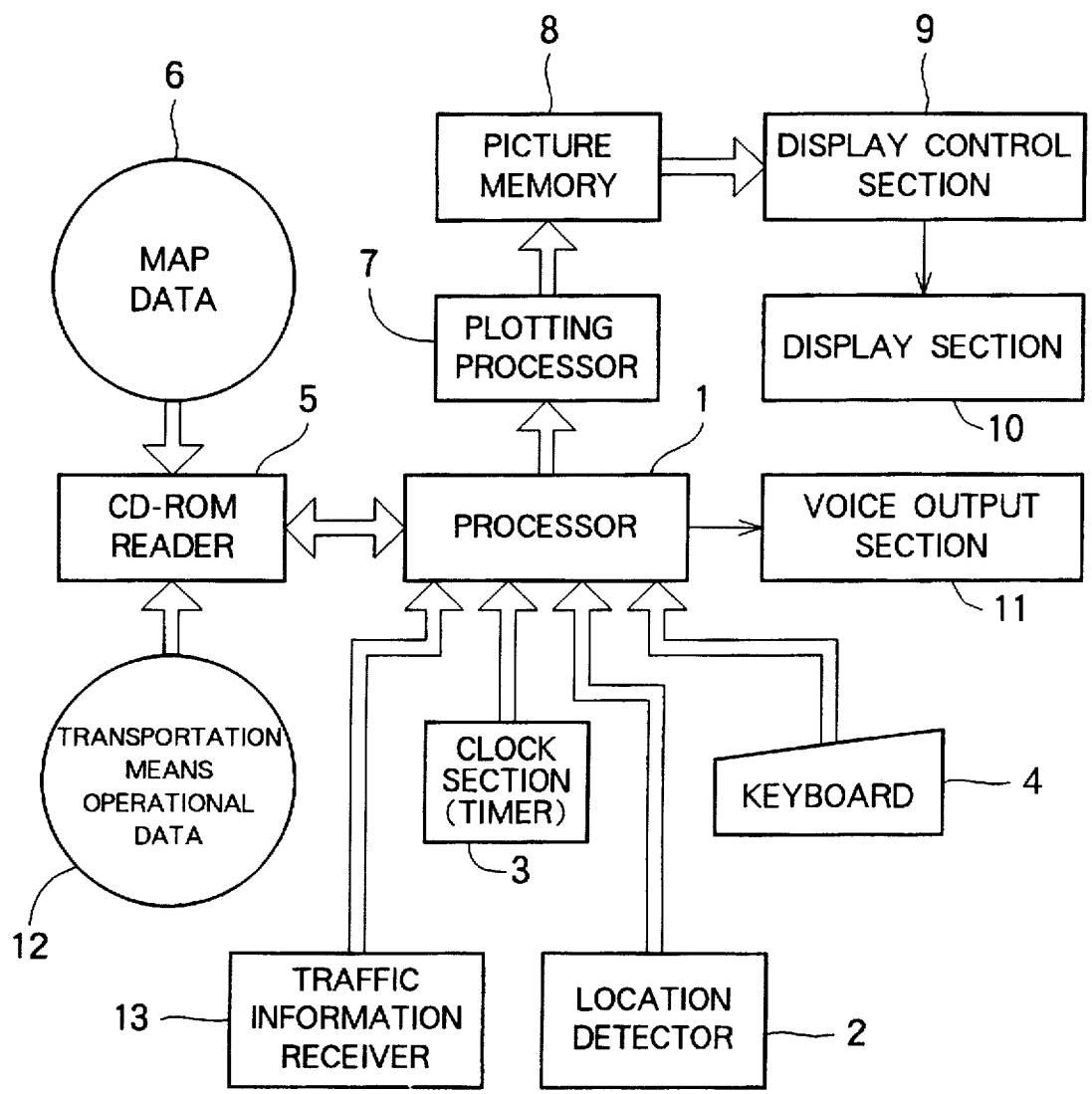
FIG. 1 is a block diagram illustrating a navigation system according to the present invention.

Initially, reference is made to FIG. 1, which shows a navigation system according to the present invention in block diagram. As shown in the figure, the navigation system is comprised of a processor 1, a location detector 2, a clock section (timer) 3 having a calendar function such as years, months, days and days of week, a keyboard 4, a CD-ROM reader 5, map data 6 stored in a CD-ROM, a plotting processor 7, a picture memory 8, a display control section 9, a display section 10 and a voice output section 11. Designated by reference numerals 12 and 13 are transportation means operational schedule data (timetable, etc.) stored in the CD-ROM and traffic information receiver.

The processor 1 reads the current location of a vehicle carrying the navigation system from the location detector 2, which is formed of a GPS receiver and the like. The current location is represented in the form of absolute positions of the Earth, such as x degrees of north latitude and y degrees of east longitude. Based on the read current location and display magnification, designated by a command input through the keyboard 4, of a picture to be displayed, the processor 1 computes the latitude of the top and bottom marginal edges and the longitude of the right and left marginal edges of the picture to be displayed. Then, the processor 1 reads, by means of the CD-ROM reader 5, map data, which may be accommodated within a field defined by the computed top and bottom and right and left marginal edges, from the map data 6 stored in the CD-ROM and transfers the read map data to the plotting processor 7.

The plotting processor 7 receives the map data transferred from the processor 1, executes the command contained in the map data to generate graphic data in the form of dot patterns, representative of roads, railroads and stations, which are component elements of the relevant map, and writes the graphic data in a predetermined portion of the picture memory 8. The plotting processor 7 transforms character codes contained in the map data received from the processor 1 into corresponding dot pattern characters and writes the resulting data in a predetermined portion of the picture memory 8.

The map in the form of dot patterns, wrote in the picture memory 8, are periodically read under the control of the display control section 9 and displayed on the display section 10 formed of a liquid crystal panel or a Braun tube (CRT). In the map displayed on the display 10, the current vehicle location detected by means of the location detector 2 is displayed by way of predetermined codes. The processor I communicates speech information necessary for the navigation to a vehicle driver through the voice output section 11 having a loud speaker, etc.

Apart from the features required for a known navigation system, the navigation system according to the preferred embodiment being described includes operational schedule data (timetable, etc.) 12 of transportation means, stored in the CD-ROM required for displaying operational schedule information of the transportation means, and the traffic information receiver 13. The operation schedule data 12 of the means of transportation include railroads and names of bus-route streets, which are present in each area defined by latitudinal and longitudinal limits in combination; operational timetable of trains and buses that move or run along the railroads and streets; and locations of each train and bus, which are defined jointly by the latitude and longitude at each predetermined time interval.

Figure 2:
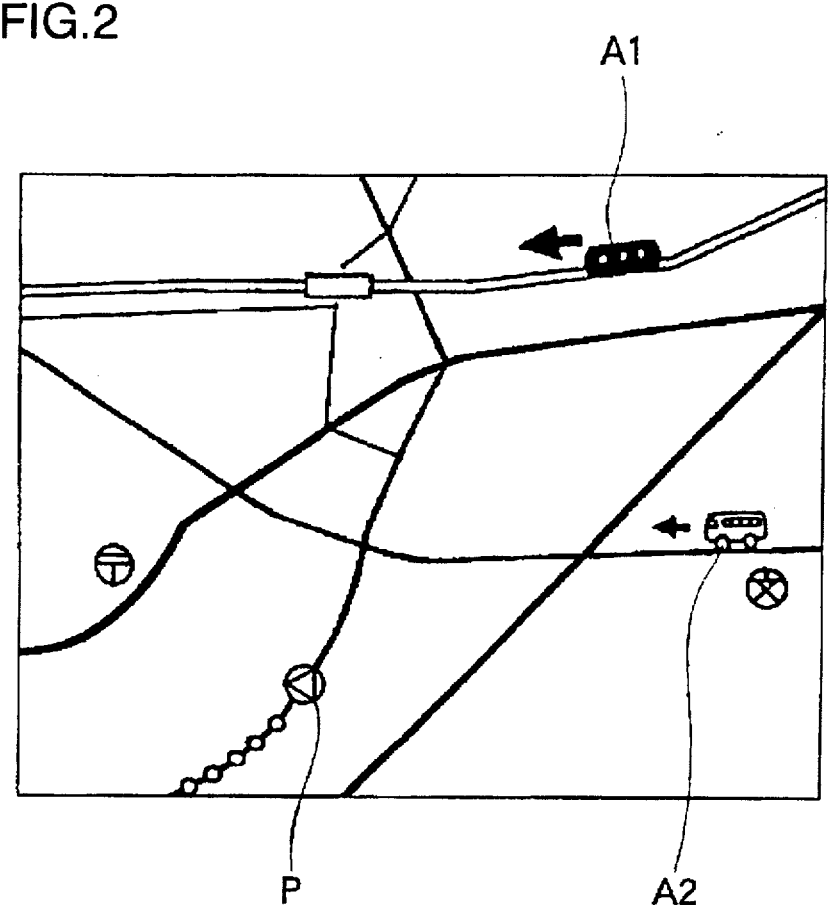
FIG. 2 is a schematic view illustrating a sample picture displayed on a screen of the system.

By reading the transportation means data 12 via the CD-ROM reader 5, the processor 1 retrieves railroads and roads which are present in a display area defined by the latitudinal and longitudinal limits in combination and being displayed on the display 10, determines the locations of trains and/or buses operating on or along the railroads and roads and communicates their display positions to the plotting processor 7. Upon receipt of such communication, the plotting processor 7 writes graphics of the trains in that portion of the picture memory 8 which corresponds to the display positions of the trains and writes graphics of the buses in that portion of the picture memory 8 which corresponds to the display positions of the buses. As a result, the current locations of train A1 and bus A2 are displayed on the screen of the display section 10 together with the location P of the vehicle represented by a triangle, as illustrated in FIG. 2. As the vehicle approaches a railroad crossing, the vehicle driver may be warned of an approaching train by way of a message or a buzz through a loud speaker and the like of the voice output section 11.

Figure 3:
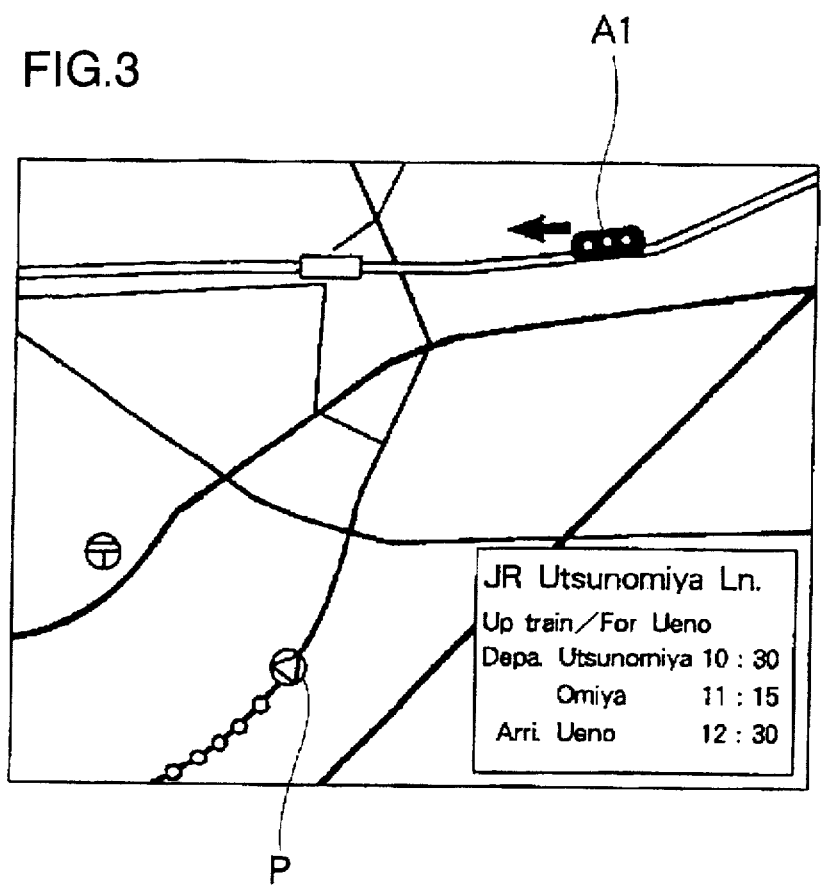
FIG. 3 is a schematic view illustrating a sample picture displayed together with operational schedule data on the screen.

As the driver inputs through the keyboard 4 a command for displaying the operation timetable of the train being displayed, the operation timetable of the displayed train is displayed at a corner of the screen, as shown in FIG. 3. To simplify operation for the driver, the display section 10 may preferably be in the form of a touch-panel designed to display such operational schedule by pressing with a finger of the driver the graphics of the train being displayed. When desired, the driver can input a command through the keyboard 4, which forms a command input section, so that the operation time table of a train following the train being displayed may be displayed. It is also possible to display the current location of a particular train on the screen by inputting the name or identification number of the train through the keyboard 4.

Traffic information receiver 13 receives the operation conditions of transportation means, transmitted via a radio circuit, and transmits the received data to the processor 1. Based on the operation conditions transmitted from the traffic information receiver 13, the processor 1 adjusts the current location of the train or bus, as well as the operation timetable thereof.

Figure 4:
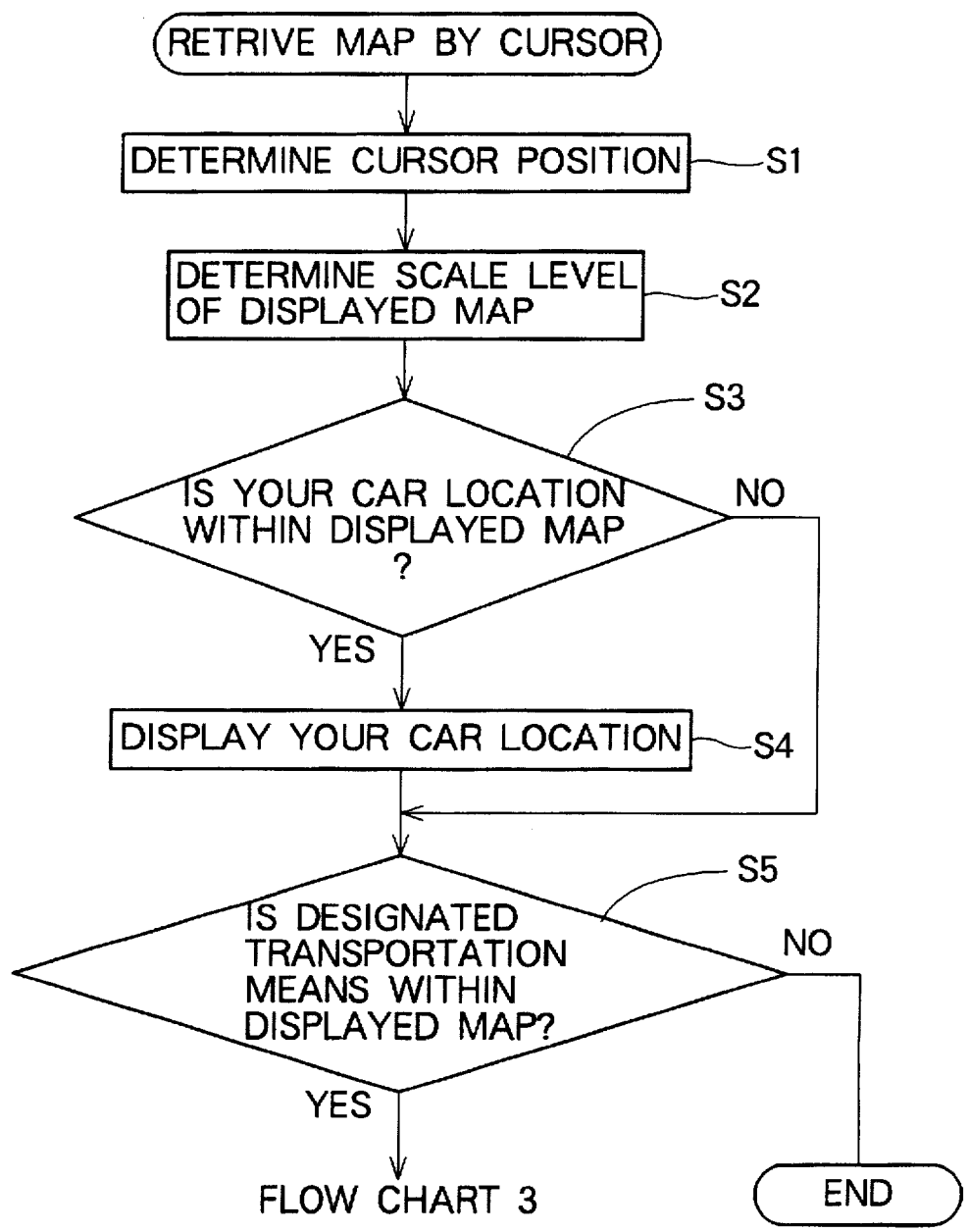
FIG. 4 is a flow chart showing an operation for retrieving a map by means of a cursor.

Referring now to the flow charts of FIG. 4–FIG. 6, operation of the navigation system according to the present invention will be discussed. FIG. 4 is a flow chart showing the operation for map retrieval by use of a cursor. The processor 1 determines a cursor position on the displayed map designated by an image position designator (pointing device) such as a mouse and a cursor key of the keyboard 4 as the vehicle remains stable (S1). Next, the processor 1 determines the display magnification (scale level) of a map to be displayed on the screen (S2). Then, the processor 1 determines whether the vehicle of the operator or driver is located within the map area or field displayed on the screen on the designated scale with the designated cursor position at its center (S3) and causes the current location, marked by, for example, a triangle and referenced P, of the vehicle to be displayed when the vehicle is within the map field being displayed (S4). Thereafter, the processor 1 determines whether the public transportation means, designated by the driver through the keyboard 4, is positioned within the map field being displayed on the screen (S5) and executes the processing of FIG. 6 when the transportation means is present therein.

Figure 5:
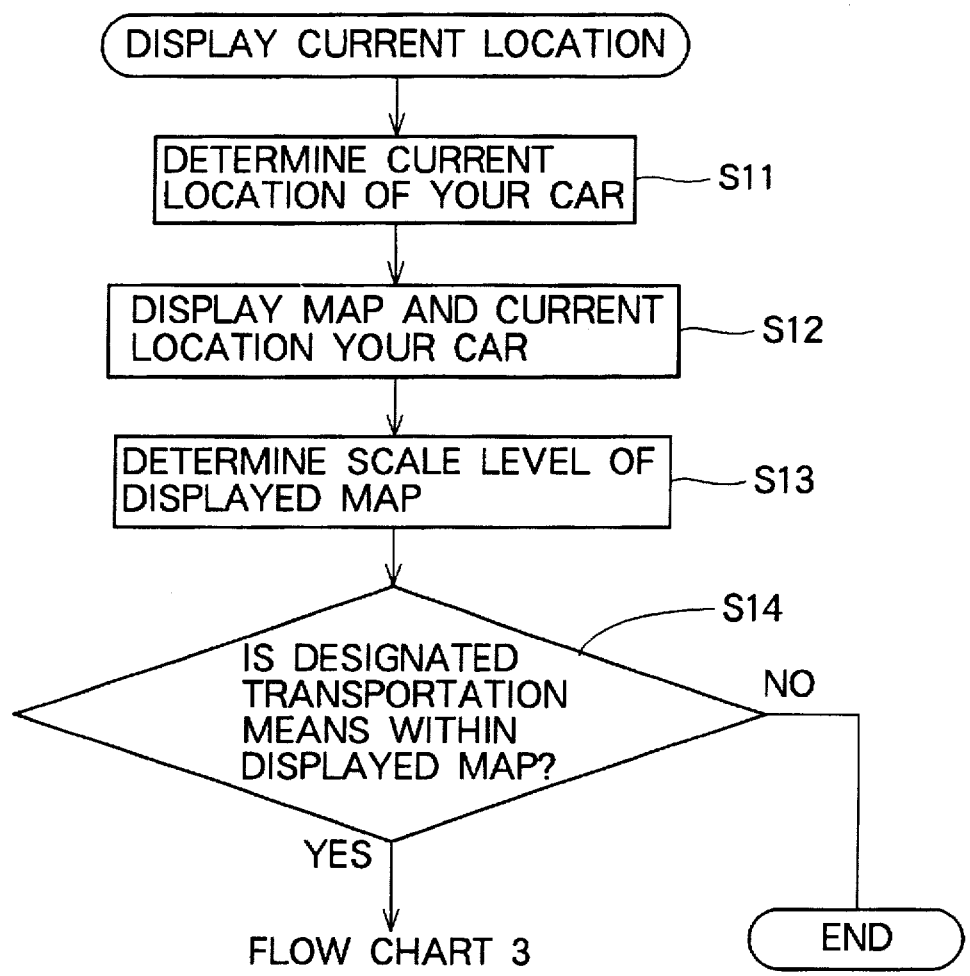
FIG. 5 is a flow chart showing an operation for displaying the current location of a vehicle.

FIG. 5 is a flow chart showing the operation in which the current vehicle location is displayed. Based on the location data output from the location detector 2, the processor 1 determines the current location of the vehicle (S11), whereafter it reads map data incorporating or encompassing the current vehicle location from the CD-ROM and displays the corresponding map and the current vehicle location on the screen (S12). Thereafter, the processor 1 determines the scale level of the map being displayed on the screen (S13), determines whether the designated transportation means is located within the displayed map field with the current vehicle location at its center (S14) and follows the operation steps of FIG. 6 when the designated transportation means is present therein.

Figure 6:
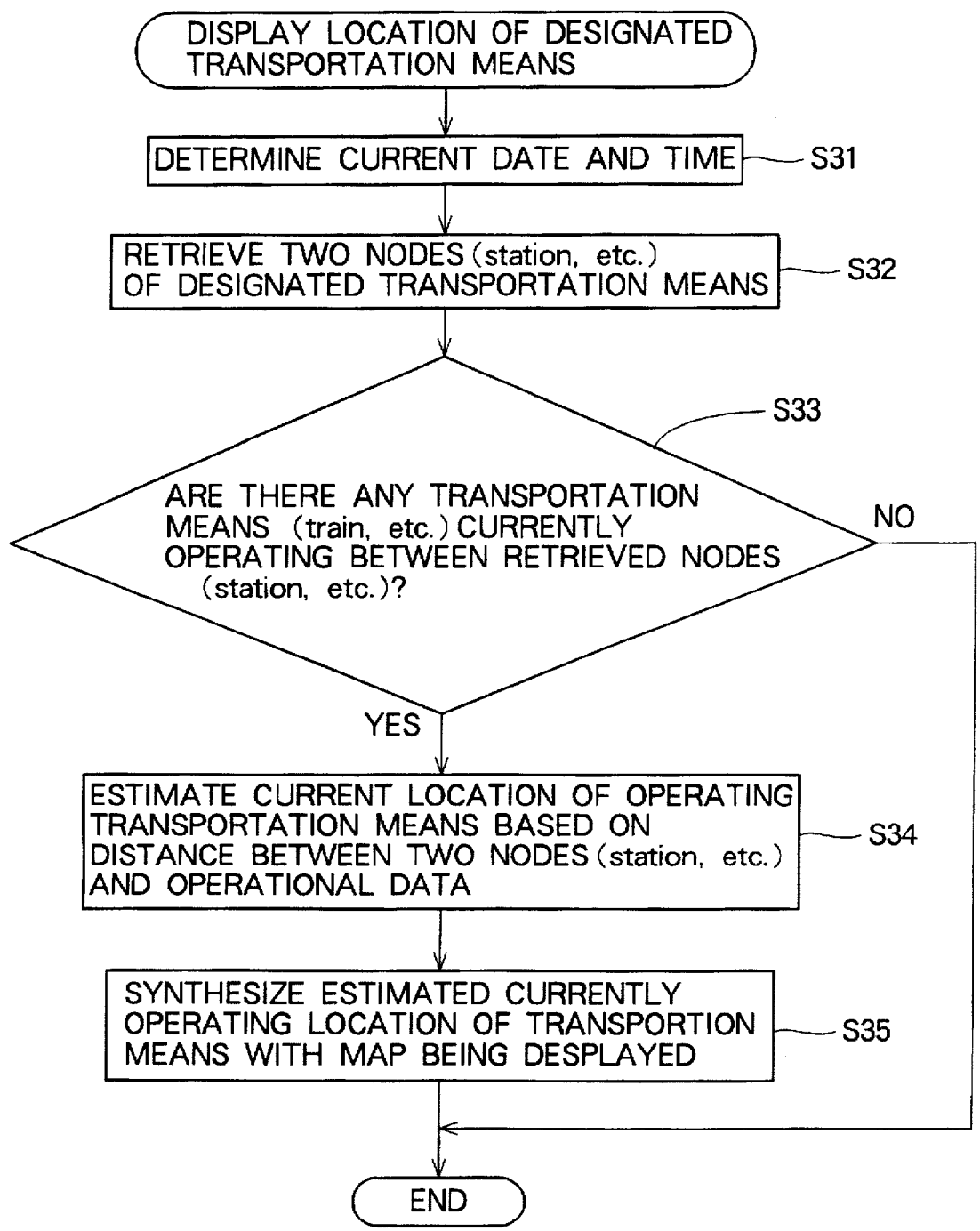
FIG. 6 is a flow chart showing an operation for computing the current location of public transportation means and displaying the computed location.

FIG. 6 is a flow chart showing operations involved in computing and displaying the location of the designated transportation means. The processor 1 determines the current time and date based on the day/time data of the clock section (timer) 3 (S31). Next, having reference to the operational schedule data (diagram data) of the transportation means designated by the driver, the processor 1 retrieves two nodes (e.g., train stations and bus stops) having respective operational schedule data (diagram data) and being in close proximity to the vehicle location (S32). Then, based on the operational schedule data (diagram data) of transportation means, the processor 1 determines whether there is transportation means (train or bus) currently operating or running between the two retrieved nodes (stations or bus stops)(S33). When there are transportation means currently operating between the two nodes (stations or bus stops), the processor 1 estimates the current operational location of the transportation means (train or bus) on the basis of the service or operation distance between the two nodes (stations or bus stops) and operational schedule data (diagram data) (S34) and displays a mark representing the estimate operational location of the transportation means on the screen in merged or synthesized relations with the map also displayed thereon (S35).

The processing steps shown in FIG. 4–FIG. 6 are carried out at predetermined time intervals. These predetermined time intervals should preferably be set to vary depending on the scales of reduction (scale levels) of the maps displayed. For example, when a small scale of reduction is employed to display a narrow region of a map on an enlarged scale, the repeat time (predetermined time) with respect to the processing steps of FIG. 4–FIG. 6 should be made short so that the moving location of the running transportation means (train or bus) can be precisely displayed.

Figure 7:
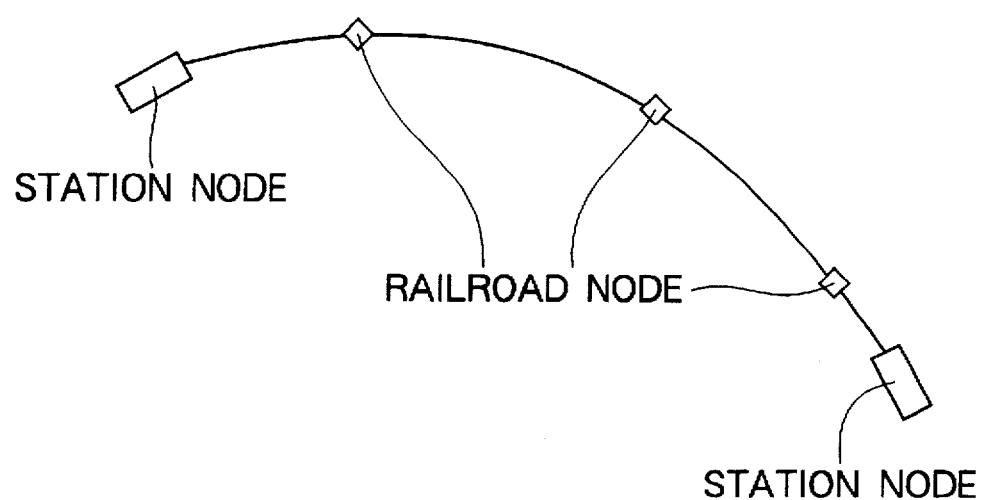
FIG. 7 is a schematic view illustrating a specific example of a node.

FIG. 7 illustrates example forms of nodes of the means of transportation. Different nodes are employed depending on the kinds of transportation means. In the illustrated example, two different nodes are employed, namely, a railroad (route) node and a station node. Each node has data such as location, distance to an adjacent node and railroad name (line name). Each station node has the operational schedule (diagram) data of the relevant transportation means.

Figure 8:
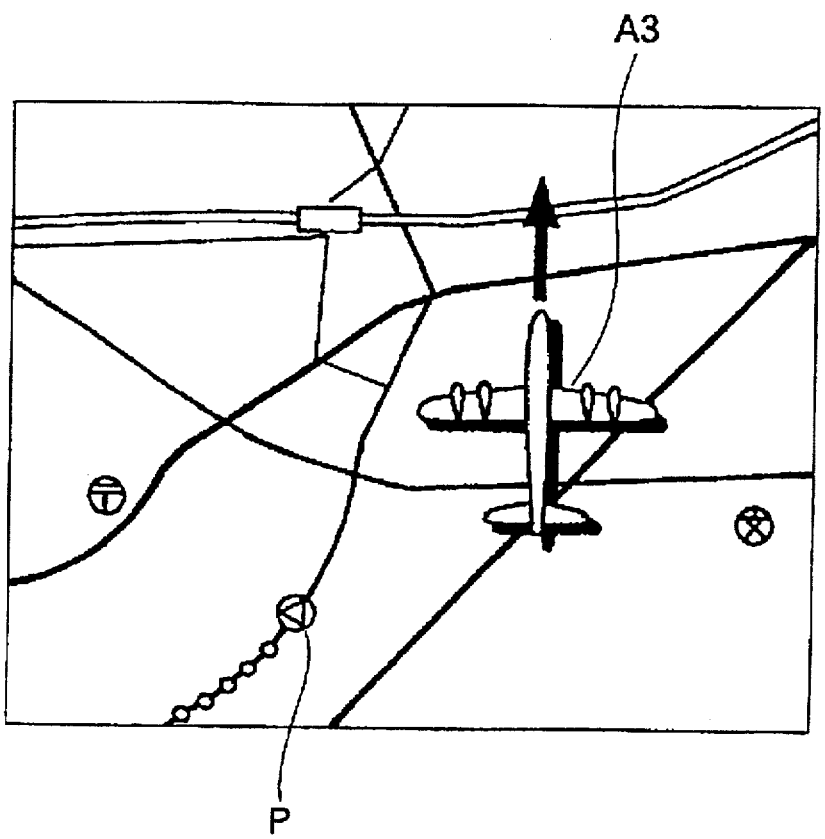
FIG. 8 is a schematic view illustrating another sample picture displayed on the screen.

FIG. 8 illustrates a screen displaying a picture retrieved from the transportation means operation schedule data 12 in which the operational schedule data of a private airplane A3 flying over the vehicle are incorporated. Preferably, the airplane A3 is displayed when a large field is displayed on the screen. In light of the significant differences in speeds of the vehicle and airplane, displaying the airplane A3 on the screen would rather serve for the purpose of amusement than for the purpose of practical uses.

Although the navigation system according to the embodiment described above is arranged to display trains and buses on the screen in graphic form, alternative arrangements are also possible. For example, the locations of the trains and buses may be displayed by flickering of luminous points lights, instead of by such graphic forms. When desired, the system may be arranged to display only the operation timetable, omitting the location displaying function.

The system has been described as incorporating the traffic information receiver 13 so that the operational conditions of trains and buses can be adjusted but such arrangement may be omitted when so desired as to lower the cost of production of the system. Contrarily, instead of recording the operational schedule data of the transportation means in the CD-ROM in advance, such data may be received by means of the traffic information receiver 13 and stored in a memory within the processor 1.

Description has been made on the arrangement with the transportation operation schedule data including positions, designated jointly by the latitude and longitude at each predetermined time, of trains and buses. As an alteration, the arrangement may be constructed such that the positions of the trains and buses at each predetermined time will be computed by the processor 1 based upon the time of departure from train stations and bus stops and current time.

Instead of the mode of display as shown in FIG. 2, a separate mode of display may be employed in which the background map is scrolled in response to movement of the vehicle whilst the vehicle is constantly displayed at the center of the screen. In the scroll mode of display, it is difficult to determine the direction of run and speed of movement of a bus. In this instance, a mode of display may be employed in which display positions are discretely altered every time positional displacement exceeds a predetermined value, instead of continuously varying the bus location.

Although the system has been described as including trains, buses and private airplanes as examples of the transportation means to be displayed, subways, boats and the like may also be included as the means of transportation.

The moving object carrying the navigation system according to the present invention has been described as a vehicle but the navigation system may also be mounted on other moving objects such as boats.

As thus far explained in detail, by addition of only the operational schedule data of means of transportation and required processing program, the navigation system according to the present invention is provided with the new function of displaying information relative to the transportation means on the screen, whereby its cost performance is improved.

With capability of displaying train information, the system is particularly useful in that when passing an invisible railroad crossing, a train approaching the crossing can be displayed, thus increasing safety at the crossing.

What is claimed is:

1. A navigation system for determining the current location of a moving object in which the navigation system is mounted, reading data of a map incorporating the determined current location and displaying the current location of the moving object together with the map on a screen, said navigation system comprising:

operational schedule data storage means for storing operational schedule data of public transportation means, other than said moving object, operating along at least one of railroad, road and air routes contained in said map data; and display means for reading said operational schedule data from said operational schedule data storage means and displaying said operational schedule data on the screen.

2. A navigation system according to claim 1, wherein said display means displays an operation location of at least one of a train, a bus and an airplane on the map on the screen in accordance with said operational schedule data, read from said operational schedule data storage means, of said public transportation means.

3. A navigation system according to claim 2, including individual graphics corresponding to said train, bus and airplane, wherein said train, bus and airplane are displayed in the form of the respective said individual graphics on the screen at said operation location in accordance with said operational schedule data.

4. A navigation system according to claim 1 or 2, wherein said moving object is a vehicle.

5. A navigation system for determining the current location of a vehicle having the navigation system, reading data of a map incorporating the determined current location and displaying the current location of the vehicle together with the map on a screen, said navigation system further comprising:

operational schedule data storage means for storing operational schedule data of at least one public transportation means other than said vehicle, operating along a route of said at least one public transportation means contained in said map data; and means for reading said operational schedule data from said operational schedule data storage means and displaying the current location on said route of said at least one public transportation means on the screen based on said operational schedule data.

6. A navigation system according to claim 5, including individual graphics corresponding to each different type of said at least one public transportation means, and means for displaying said individual graphics on the screen at said current location on said route of said at least one public transportation means in accordance with said operational schedule data.

* * * * *